United States Patent
Lee et al.

(10) Patent No.: US 7,066,602 B2
(45) Date of Patent: Jun. 27, 2006

(54) PROJECTION TYPE IMAGE DISPLAY SYSTEM CAPABLE OF COLOR SCROLLING

(75) Inventors: Hee-joong Lee, Anyang-si (KR); Kun-ho Cho, Suwon-si (KR); Dae-sik Kim, Suwon-si (KR); Sung-ha Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 16 days.

(21) Appl. No.: 10/811,144

(22) Filed: Mar. 29, 2004

(65) Prior Publication Data

US 2004/0246442 A1    Dec. 9, 2004

Related U.S. Application Data

(60) Provisional application No. 60/457,916, filed on Mar. 28, 2003.

(30) Foreign Application Priority Data

May 26, 2003    (KR) .................. 10-2003-0033343

(51) Int. Cl.
| | |
|---|---|
| *G03B 21/00* | (2006.01) |
| *G03B 21/20* | (2006.01) |
| *G03B 21/28* | (2006.01) |
| *G02B 26/08* | (2006.01) |
| *H04N 5/74* | (2006.01) |
| *G02F 1/1335* | (2006.01) |

(52) U.S. Cl. .................... 353/31; 353/33; 353/37; 353/81; 353/84; 353/99; 353/102; 359/205; 359/210; 348/759; 348/771; 349/7

(58) Field of Classification Search .............. 353/30, 353/20, 31–34, 37, 84, 97, 98, 99, 101, 102, 353/81; 348/742, 743, 759, 744, 761, 770, 348/771; 349/5, 7–9; 359/196, 205, 209, 359/210, 216

See application file for complete search history.

(56) References Cited

U.S. PATENT DOCUMENTS

| | | | | |
|---|---|---|---|---|
| 6,288,815 | B1* | 9/2001 | Lambert | 359/196 |
| 6,535,256 | B1* | 3/2003 | Ishihara et al. | 349/5 |
| 6,813,087 | B1* | 11/2004 | Davis | 359/634 |
| 6,839,095 | B1* | 1/2005 | Bierhuizen et al. | 349/9 |
| 2002/0191154 | A1 | 12/2002 | Shahzad et al. | |
| 2003/0169376 | A1* | 9/2003 | Ouchi et al. | 348/744 |
| 2003/0202259 | A1* | 10/2003 | Nishimae et al. | 359/726 |

FOREIGN PATENT DOCUMENTS

| | | |
|---|---|---|
| JP | 11-281930 A | 10/1999 |
| KR | 1999-02347 A | 1/1999 |

* cited by examiner

*Primary Examiner*—W. B. Perkey
*Assistant Examiner*—Rochelle Blackman
(74) *Attorney, Agent, or Firm*—Sughrue Mion, PLLC

(57) ABSTRACT

A highly-efficient projection system is provided, including a light source, a color separator, a scrolling unit, a light valve, and a projection lens unit. The color separator separates an incident beam according to color. The scrolling unit includes at least one lens cell and converts the rotation of the lens cell into a rectilinear motion of an area of the lens cell through which light passes so that an incident beam is scrolled. The light valve includes a plurality of micromirrors independently driven according to image signals to change a reflection angle of incident light. The light valve processes a beam transmitted by the color separator and the scrolling unit according to an image signal and forms a color picture. The projection lens unit magnifies the color picture formed by the light valve and projects the magnified color picture onto a screen.

14 Claims, 17 Drawing Sheets

PROJECTION TYPE IMAGE DISPLAY SYSTEM CAPABLE OF COLOR SCROLLING

This application claims the priority of Korean Patent Application No. 2003-33343, filed on May 26, 2003, in the Korean Intellectual Property Office, and the benefit of U.S. Patent Provisional Application No. 60/457,916, filed on Mar. 28, 2003, in the U.S. Patent and Trademark Office, the disclosures of which are incorporated herein in their entirety by reference.

BACKGROUND OF THE INVENTION

1. Field of the Invention

The present invention relates to a projection system, and more particularly, to a highly-efficient single panel digital light processing (DLP) projection system which can be made compact by scrolling color bars using a single scrolling unit and more light efficient by utilizing a low-power low-priced lamp.

2. Description of the Related Art

In general projection systems, a light valve controls the on/off operation of light emitted from a light source on a pixel-by-pixel basis and forms a picture. A magnifying projection unit enlarges the picture to be displayed on a large screen.

A DLP projection system, which uses as a reflective display a DLP panel manufactured using a micro-electro mechanical system (MEMS), is under development.

A DLP panel is manufactured by two-dimensionally arranging a large number of micromirrors corresponding to pixels. The DLP panel turns on or off incident light by independently driving the micromirrors according to image signals corresponding to the pixels and accordingly changing the reflection angle of the incident light, thereby forming a picture.

A general projection system, utilizing such a DLP panel for reflective display, includes a total internal reflection (TIR) prism so that the path of light emitted from an illumination unit and entering the DLP panel is different from that of picture-forming light reflected by the DLP panel.

When the TIR prism is used, incident light is totally reflected by the TIR prism and then illuminates the reflective display. The path of the illuminating light is changed by the reflective display so that the illuminating light advances toward the projection unit. Light advancing toward the projection unit is incident on a total reflection surface of the TIR prism. Since the light is incident upon the total reflection surface of the TIR prism at a small incidence angle, it is directed toward the projection unit without being totally reflected.

Projection systems are classified into either three-panel projection systems or single-panel projection systems, according to the number of light valves used. Three-panel projection systems provide better optical efficiency than single-panel projection systems, but are generally more complicated and expensive. Single-panel projection systems can have a smaller optical system than the three-panel projection systems. However, these single-panel systems provide only ⅓ of the optical efficiency of the three-panel projection systems because red (R), green (G), and blue (B) colors, into which white light is separated, are used sequentially. To be more specific, in a single-panel projection system, white light radiated from a white light source is separated into R, G, and B color beams using color filters, and the three color beams are sequentially sent to a light valve. The light valve operates according to the sequence of color beams received and creates images. As described above, a single-panel projection system uses color beams sequentially, therefore, the light efficiency is reduced to ⅓ the light efficiency of a three-panel projection system.

According to one color scrolling method designed to increase the optical efficiency of a single-panel projection system, white light is separated into R, G, and B color beams, and the three color beams are simultaneously sent to different locations on a light valve. Since an image cannot be produced until all of the R, G, and B color beams reach each pixel of the light valve, the color beams are moved at a constant speed by a color scrolling means.

FIG. 1 illustrates a conventional DLP single panel projection system using a color wheel 103. Referring to FIG. 1, white light emitted from a light source 102 is separated into red (R), green (G), and blue (B) beams by the color wheel 103 in a time sequential manner. The R, G, and B beams pass through a light tunnel 105 so as to have illumination uniformity due to internal multiple reflections. Then, light passed through the light tunnel 105 is made incident upon a TIR prism 135, which is disposed 45 degrees, via a light path changing unit 115. The light path changing unit 115 includes a first reflection mirror 108, a first lens 112, a second reflection mirror 114, and a second lens 117 which are sequentially arranged. The first reflection mirror 108 reflects the light passed through the light tunnel 105. The first lens 112 focuses light reflected by the first reflection mirror 108. The second reflection mirror 114 redirects light passed through the first lens 112 toward the TIR prism 135. The second lens 117 focuses light reflected by the second reflection mirror 114 on the TIR prism 135. Thereafter, the light incident upon the TIR prism 135 illuminates a DLP panel 130 according to the total reflection condition of the TIR prism 135. The DLP panel 130 includes pixels diagonally driven at 45 degrees. This illuminating light is modulated into an image which is magnified by a projection lens 140 and projected onto a screen.

In the DLP single-panel projection system of FIG. 1, the white light emitted from the light source 102 is separated into R, G, and B beams by the color wheel 103 in a time sequential manner, and the R, G, and B beams are focused on the DLP panel 130 to form a picture. Hence, light efficiency is low.

The low light efficiency can be increased by using a high-brightness light source and a high gain screen. However, because a high-brightness lamp usually has a low durability, the use of this lamp shortens the life span of the projection system. Also, the use of a high gain screen narrows a viewing angle.

SUMMARY OF THE INVENTION

The present invention provides a highly-efficient single-panel digital light processing (DLP) projection system which can be made compact by scrolling color bars using a single scrolling unit and more light efficient by utilizing a low-power low-priced lamp.

The projection system includes a light source, a color separator, a scrolling unit, a light valve, and a projection lens unit. The color separator separates an incident beam according to color. The scrolling unit includes at least one lens cell and converts the rotation of the lens cell into the rectilinear motion of an area of the lens cell through which light passes so that an incident beam is scrolled. The light valve includes a plurality of micromirrors independently driven according to image signals to change a reflection angle of incident light. The light valve processes a beam transmitted by the color separator and the scrolling unit according to an image signal and forms a color picture. The projection lens unit magnifies the color picture formed by the light valve and projects the magnified color picture onto a screen.

The projection system may further include a total internal reflection prism disposed in front of the light valve. The total internal reflection prism directs light passed through the color separator and the scrolling unit toward the light valve and directs light reflected by the light valve toward the projection lens unit. The total internal reflection prism includes a first prism, having an incidence surface, and a second prism, having an emission surface. The first and second prisms are attached to each other, and a total reflection surface for totally reflecting incident light at a predetermined angle is formed on the interface between the first and second prisms.

The projection system may further include a reflection mirror or a reflection prism disposed in front of the incidence surface of the first prism. The reflection mirror reflects light passed through the optical separator and the scrolling unit toward the incidence surface of the first prism.

The micromirrors are diagonally or perpendicularly driven according to the image signals.

The color separator may include first, second, and third dichroic filters disposed at different angles between the optical source and the scrolling unit. Each of the first, second, and third dichroic filters reflects a beam of a color and transmits beams of all other colors.

The color separator may include first, second, and third dichroic prisms sequentially attached to one another between the optical source and the scrolling unit. The first, second, and third dichroic prisms include first, second, and third dichroic filters, each of which reflects a beam of a color and transmits beams of all other colors.

The color separator may include first, second, and third dichroic filters which are disposed in parallel between the optical source and the scrolling unit and each reflects a beam of a color and transmits beams of all other colors. A prism may be installed in front of the color separator.

The scrolling unit may include a spiral lens disk on which at least one cylindrical lens cell is spirally arranged.

The scrolling unit may include first and second spiral lens disks and a glass rod. The first and second spiral lens disks are disposed apart from each other and each includes at least one cylindrical lens cell that is spirally arranged. The glass rod is interposed between the first and second spiral lens disks.

A spatial filter may be disposed between the light source and the scrolling unit so that the divergence angle of the light emitted from the light source is controlled. First and second cylindrical lenses may be respectively disposed in front of and behind the scrolling unit.

First and second fly-eye lens arrays may be sequentially disposed on the light path between the scrolling unit and the light valve. A relay lens may be disposed on a light path between the second fly-eye lens array and the light valve.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
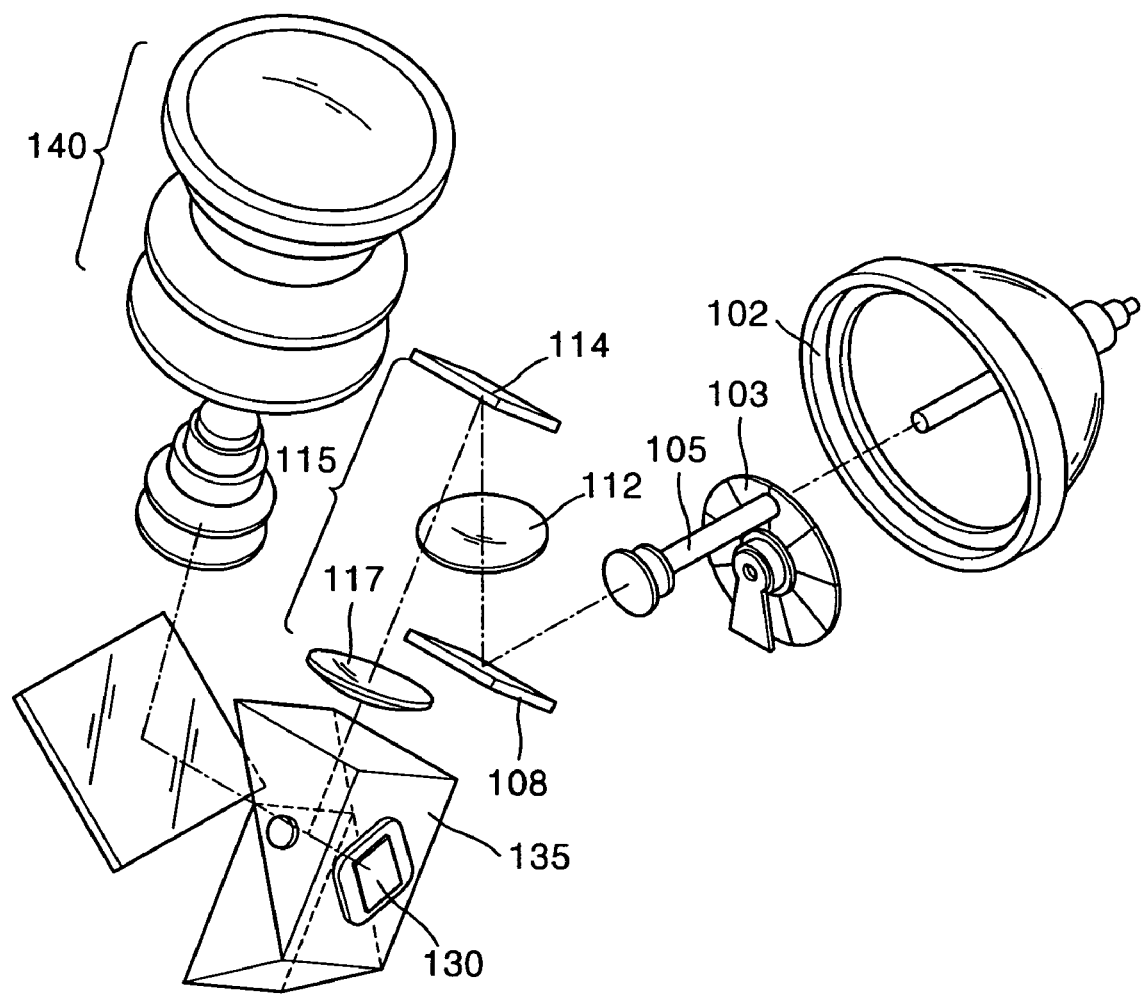
FIG. 1 is a perspective view of a configuration of a conventional projection system.

The present invention will now be described more fully with reference to the accompanying drawings, in which exemplary embodiments of the invention are shown. In the drawings, like reference numbers refer to like elements throughout, and the sizes of elements may be exaggerated for clarity.

Figure 2:
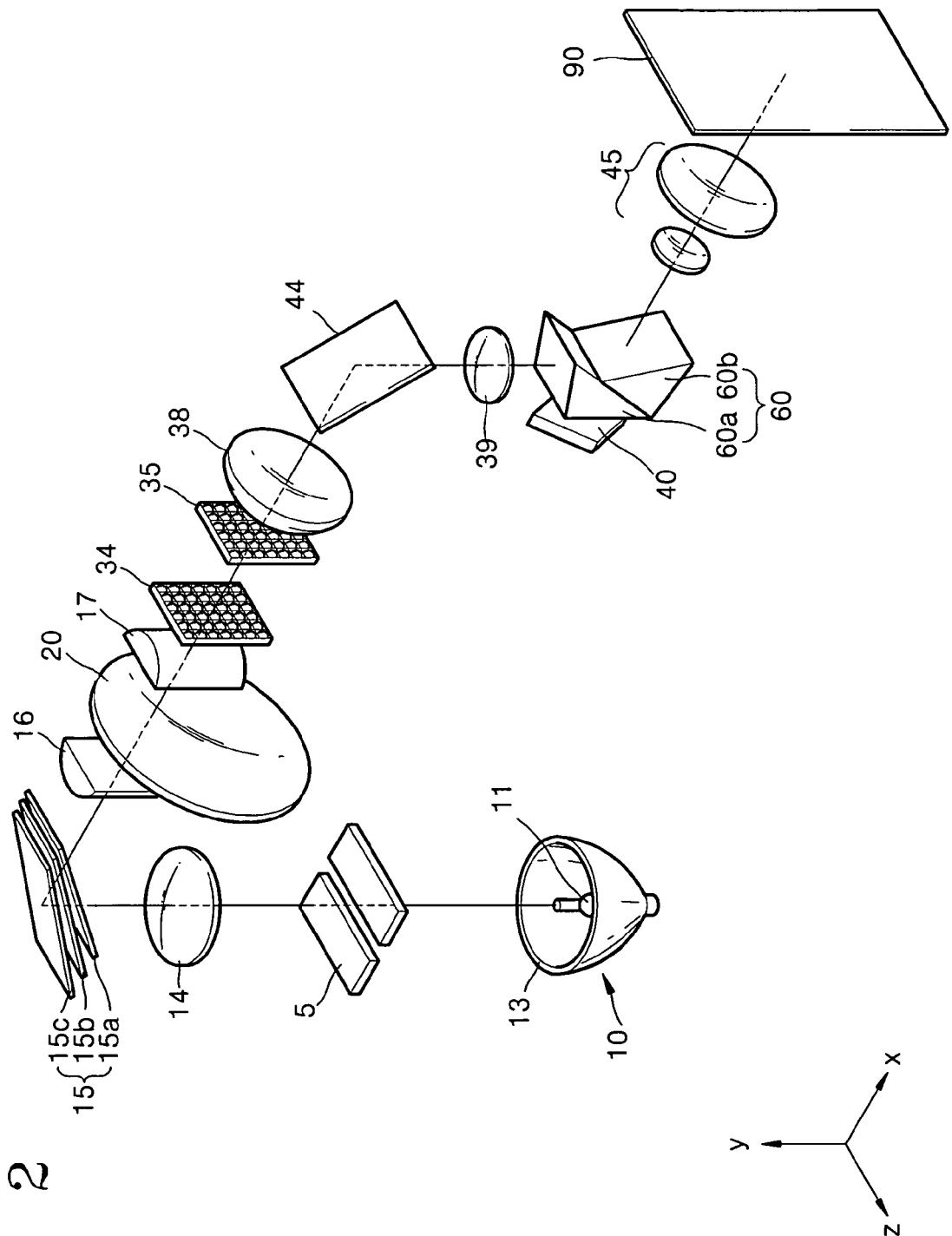
FIG. 2 is a perspective view of a configuration of a projection system according to an embodiment of the present invention.
Figure 3:
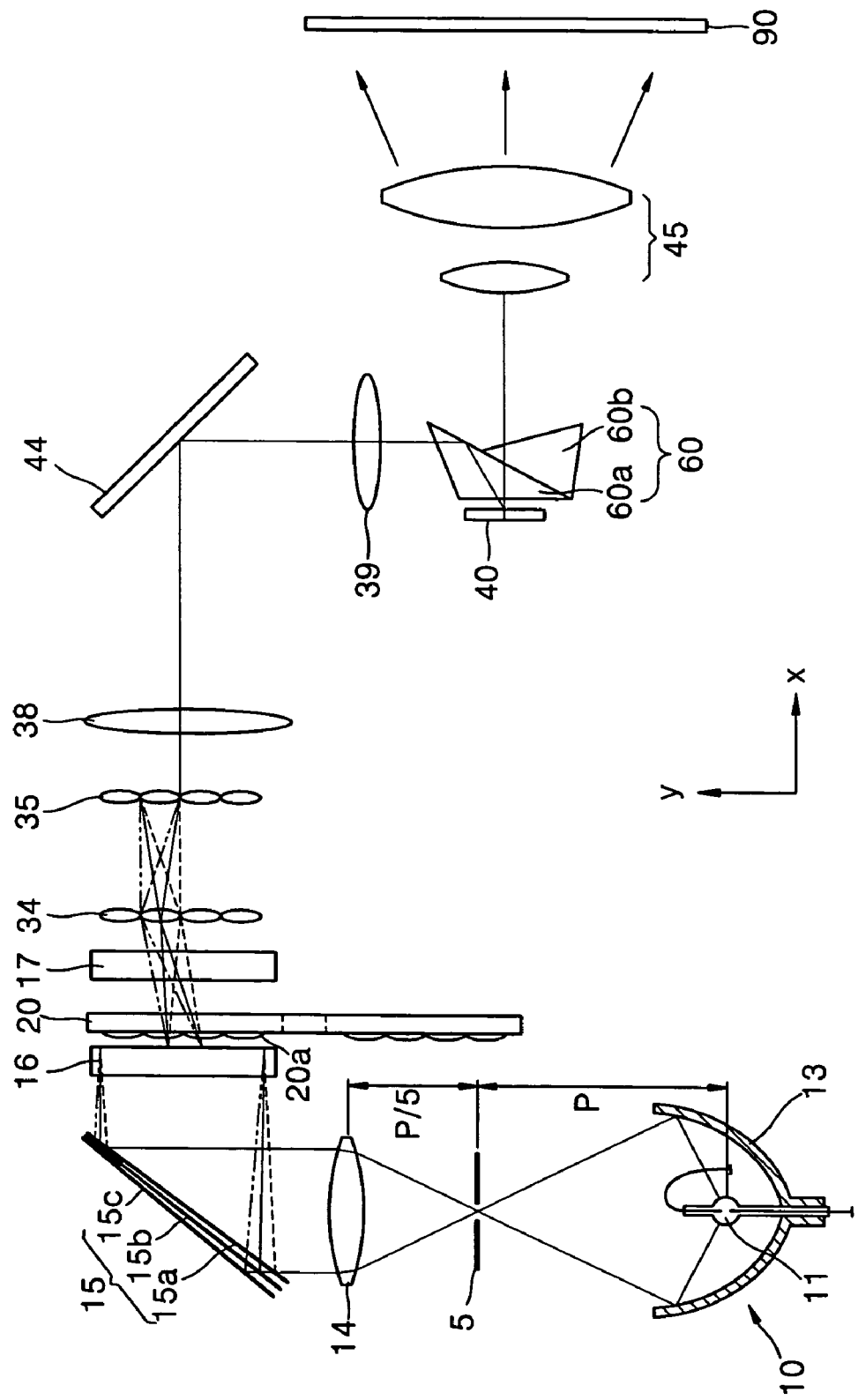
FIG. 3 is a schematic diagram of the projection system of FIG. 2.

FIGS. 2 and 3 are a perspective view and a schematic diagram, respectively, of a projection system according to an embodiment of the present invention. Referring to FIGS. 2 and 3, the projection system according to an embodiment of the present invention includes a light source 10, a color separator 15, a scrolling unit 20, a light valve 40, a projection lens unit 45, and a total internal reflection (TIR) prism 60. The color separator 15 separates light emitted from the light source 10 according to color. The scrolling unit 20 scrolls R, G, and B color beams produced by the color separator 15. The light valve 40 processes beams passed through the scrolling unit 20 according to an image signal and forms a picture. The projection lens unit 45 magnifies the picture formed by the light valve 40 and projects the magnified picture onto a screen 90. The TIR prism 60 is disposed in front of the light valve 40 and directs light passed through the scrolling unit 20 toward the light valve 40 and light reflected by the light valve 40 toward the projection lens unit 45.

The light source 10 emits white light and comprises a lamp 11, for generating light, and a reflection mirror 13, for reflecting light emitted from the lamp 11 and for guiding the path of the reflected light. The reflection mirror 13 may be an elliptical mirror whose first focal point is the position of the lamp 11 and whose second focal point is a point where light is focused. Alternatively, the reflection mirror 13 may be a parabolic mirror which uses the lamp 11 as a focal point and which collimates light beams emitted from the lamp 11. The reflection mirror 13 shown in FIGS. 2 and 3 is an elliptical mirror. If a parabolic mirror is used as the reflection mirror 13, a lens for focusing light is also included.

A collimating lens 14 for collimating incident light is disposed on a light path between the light source 10 and the optical splitter 15. P denotes the distance between the light source 10 and the focal point of the reflection mirror where light emitted from the light source 10 is focused. Preferably, but not necessarily, the collimating lens 14 is disposed at a distance of P/5 from the focal point.

A spatial filter 5, having a slit, is disposed between the light source 10 and the collimating lens 14. The spatial filter 5 controls the divergence angle (or etendue) of light emitted from the light source 10 and is preferably, but not necessarily, disposed at the focal point of the reflection mirror 13. The spatial filter 5 can control the width of the slit. The width of the slit may be controlled in a color separation direction or a color scrolling direction.

The color separator 15 separates the light emitted from the light source 10 into three color beams, namely, R, G, and B beams. The color separator 15 includes first, second, and third dichroic filters 15a, 15b, and 15c disposed at different angles with respect to an incident light axis. The color separator 15 separates incident light according to a predetermined wavelength range and reflects the separated light beams at different angles. For example, the first dichroic filter 15a reflects a beam in the red wavelength range, R, of white incident light and transmits beams in the green and blue wavelength ranges, G and B. The second dichroic filter 15b reflects the G beam of the beams transmitted by the first dichroic filter 15a and transmits the B beam. The third dichroic filter 15c reflects the B beam transmitted by the first and second dichroic filters 15a and 15b. Consequently, the R, G, and B beams, into which incident light has been separated according to wavelength by the first, second, and third dichroic filters 15a, 15b, and 15c, are reflected at different angles. One non-limiting example would be that the R and B beams are focused on the G beam and all three beams coincide at the scrolling unit 20.

The scrolling unit 20 includes at least one lens cell and scrolls the R, G, and B beams reflected by the color separator 15. The scrolling unit 20 scrolls incident color beams by converting the rotation of the lens cell into the rectilinear motion of an area of the lens cell through which light passes. This scrolling will be described later in detail.

Figure 4:
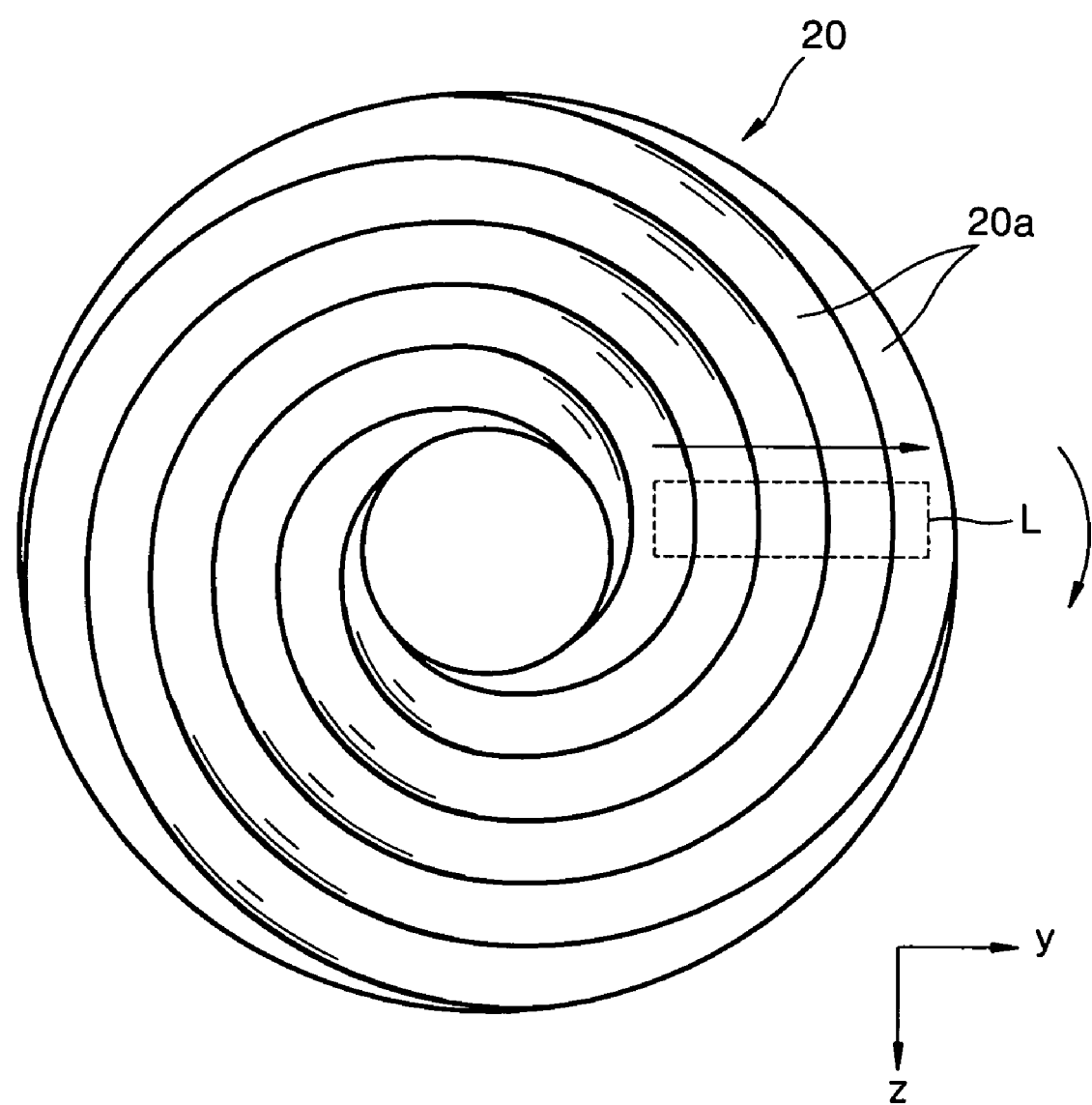
FIG. 4 is a front view of a scrolling unit of FIGS. 2 and 3.

FIG. 4 is a front view of a spiral lens disk as the scrolling unit 20. The scrolling unit 20 includes at least one cylindrical lens cell 20a, which is disposed spirally on the scrolling unit 20, as illustrated in FIG. 4. Referring to FIG. 4, reference character L denotes an area of the scrolling unit 20 on which a beam is incident.

Figure 5:
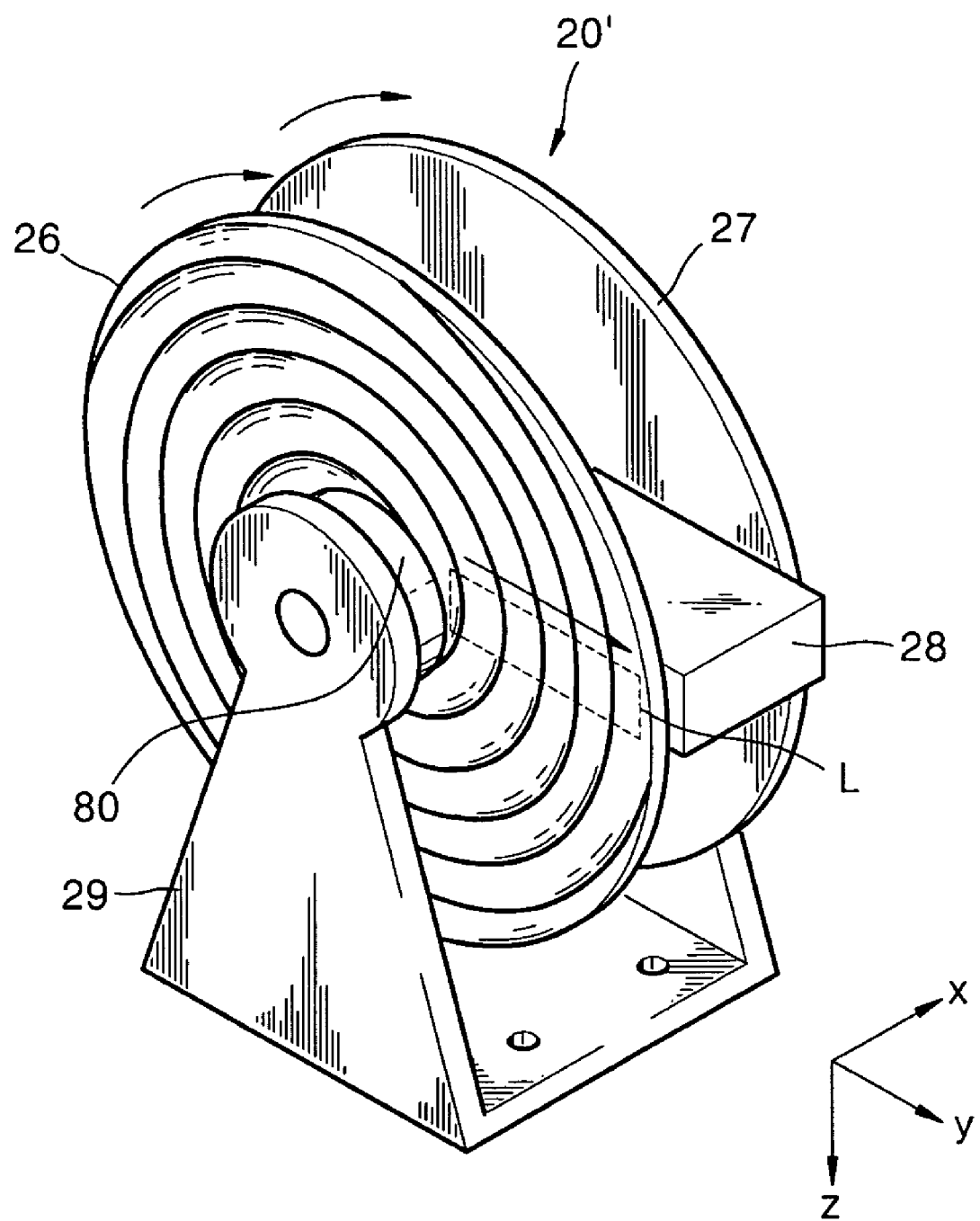
FIG. 5 is a perspective view of another scrolling unit that can be used in the projection system of FIGS. 2 and 3.

FIG. 5 is a perspective view of a scrolling unit 20' that can be adopted in the projection system of FIG. 2. Referring to FIG. 5, the scrolling unit 20' includes first and second spiral lens disks 26 and 27, disposed a predetermined distance from each other, and a glass rod 28, interposed between the first and second spiral lens disks 26 and 27. A spiral arrangement of cylindrical lens cells is disposed on at least one side of each of the first and second spiral lens disks 26 and 27. The first and second spiral lens disks 26 and 27 can be rotated and are supported by a bracket 29 such that they are rotated at the same speed by a driving source 80.

First and second cylindrical lenses 16 and 17 are disposed in front of and behind the scrolling unit 20, respectively. First and second fly-eye lens arrays 34 and 35 and a first relay lens 38 are disposed on a light path between the second cylindrical lens 17 and the light valve 40. The width of a light beam incident upon the scrolling unit 20 is reduced by the first cylindrical lens 16, thereby reducing light loss. The light transmitted by the scrolling unit 20 is returned to its original width by the second cylindrical lens 17.

A reflection mirror 44 and a second relay lens 39 are disposed between the first relay lens 38 and the TIR prism 60. The reflection mirror 44 changes the path of light passed through the first relay lens 38. The second relay lens 39 relays light reflected by the reflection mirror 44 so that the reflected light is incident upon the TIR prism 60. The reflection mirror 44 is disposed at a predetermined angle to meet the total reflection condition of the TIR prism 60.

Figure 6:
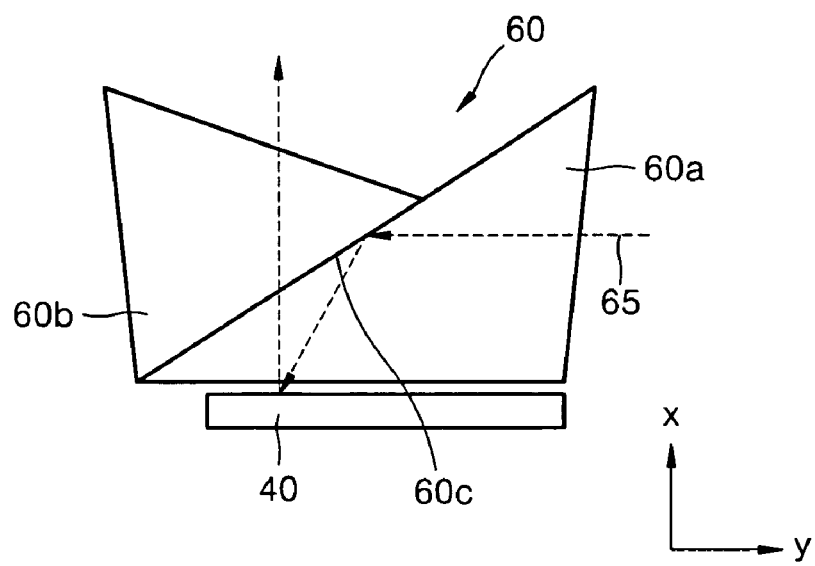
FIG. 6 is a side view illustrating the paths of light traveling within a total internal reflection (TIR) prism of FIGS. 2 and 3.

The TIR prism 60 includes a first prism 60a, having an incidence surface, and a second prism 60b, having an emission surface. As illustrated in FIG. 6, the first and second prisms 60a and 60b are attached to each other, and a total reflection surface 60c for totally reflecting incident light at a predetermined angle is formed on the interface between the first and second prisms 60a and 60b.

When light that enters the TIR prism 60 through the incident surface of the first prism 60a satisfies the total reflection condition of the TIR prism 60, it is reflected by the total reflection surface 60c toward the light valve 40. Light reflected by the light valve 40 advances toward the projection lens unit 45 via the emission surface of the second prism 60b.

Figure 7:
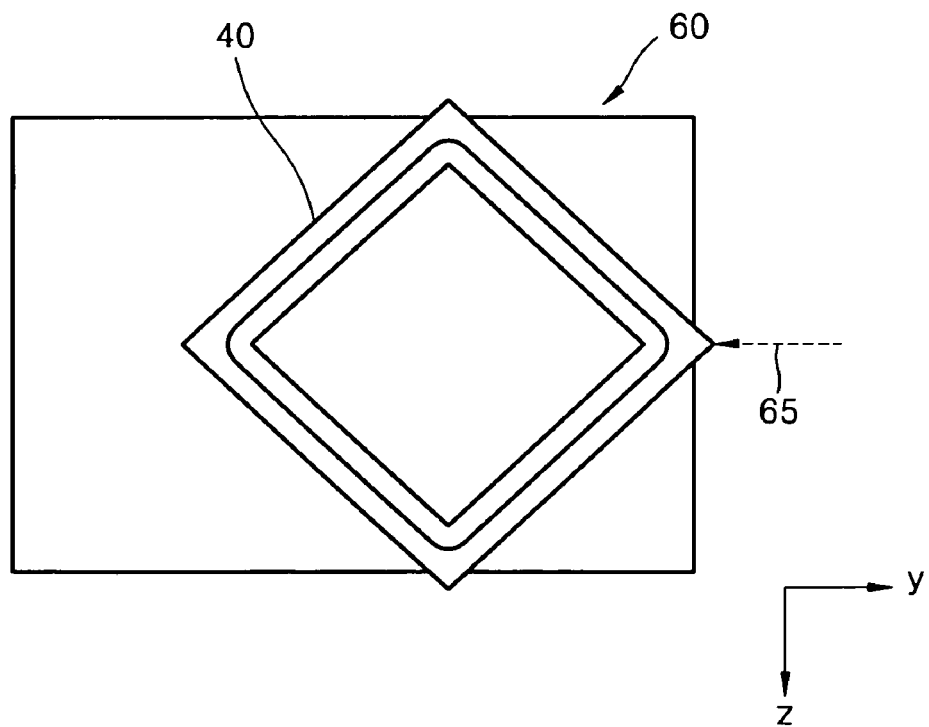
FIG. 7 is another side view of a configuration of the TIR prism and a digital light processing (DLP) panel in the projection system of FIGS. 2 and 3.

The light valve 40 processes the light totally reflected by the TIR prism 60 according to an image signal and forms a color image. The light valve 40 is a digital light processing (DLP) panel having a plurality of micromirrors that are independently driven according to the image signal. Hereinafter, the light valve 40 is also referred to as a DLP panel 40. The micromirrors change the reflection angle of incident light in order to turn on or off the incident light, thereby forming a color image. The DLP panel 40 is also referred to as a digital micromirror device (DMD). In an embodiment of the present invention, as illustrated in FIG. 7, the DLP panel 40 is disposed at 45 degrees with respect to incident light 65 so that the micromirrors are diagonally driven according to an image signal.

The projection lens unit 45 magnifies the color image formed by the light valve 40 and projects the magnified color image to the screen 90.

In the operation of the projection system of FIGS. 2 and 3 having the above-described configuration, first, white light emitted from the light source 10 is incident upon the color separator 15 via the spatial filter 5 and the collimating lens 14.

Next, the white light incident upon the color separator 15 is separated into three color beams, namely, R, G, and B color beams by the first, second, and third dichroic filters 15a, 15b, and 15c, and then the R, G, and B color beams are incident upon the scrolling unit 20. The width of the light transmitted by the first, second, and third dichroic filters 15a, 15b, and 15c is reduced by the first cylindrical lens 16 disposed in front of the scrolling unit 20.

Figure 8A:
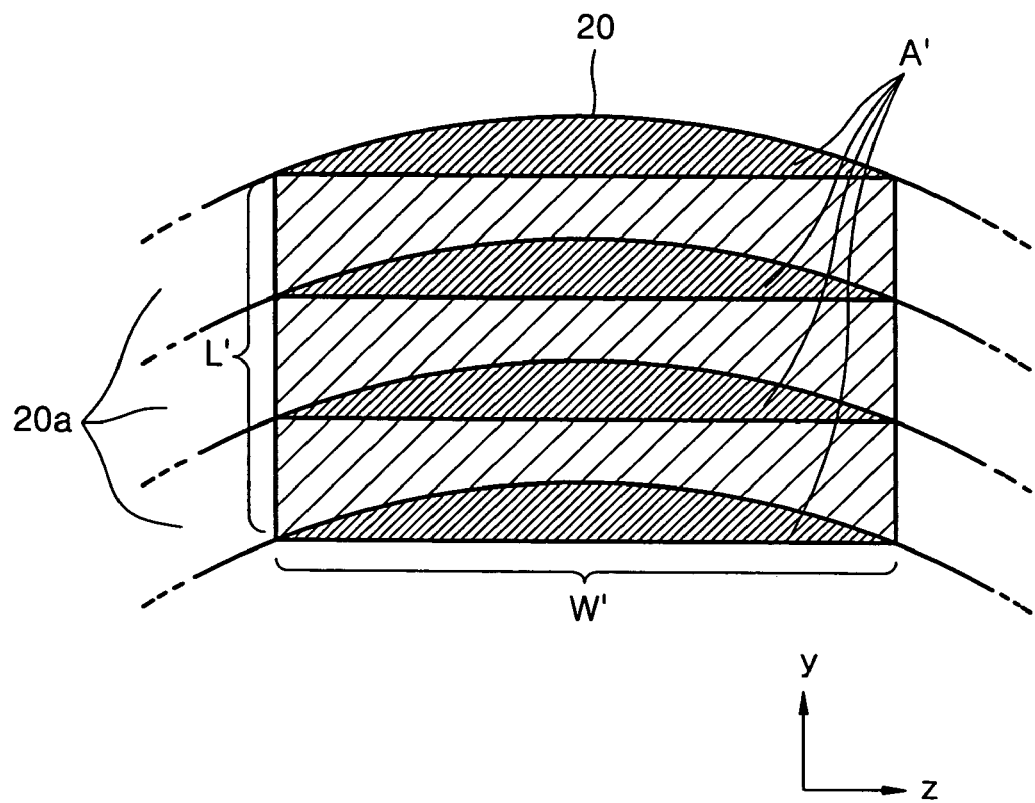
FIG. 8A illustrates the shape of a beam landing on a spiral lens disk when no cylindrical lenses are used in the projection system of FIGS. 2 and 3.
Figure 8B:
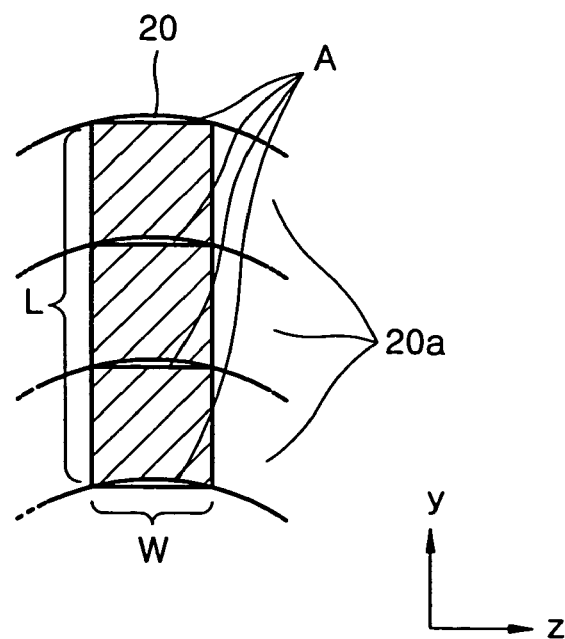
FIG. 8B illustrates the shape of a beam landing on a spiral lens disk when a cylindrical lens is used in the projection system of FIGS. 2 and 3.

FIG. 8A illustrates a beam L' incident on the scrolling unit 20 without passing through the first cylindrical lens 16. Beam L' has a width W'. FIG. 8B illustrates a beam L that has a width W reduced by the first cylindrical lens 16 and which is then incident upon the scrolling unit 20. When a beam passing through the scrolling unit 20 is relatively wide, that is, in the case of the beam L', the curved shape of the array of spirally arranged lens cells 20a does not match with that of the beam L' and thus, there is light loss over an unmatched area A' for each color. To minimize the light loss, preferably, but not necessarily, the first cylindrical lens 16 is included so that the beam L with a reduced width W is produced as illustrated in FIG. 8B. The shape of the array of spirally arranged lens cells 20a, as illustrated in FIG. 8B, aligns more closely with that of the beam L. Hence, an unmatched area A, for each color, when the first cylindrical lens 16 is used is smaller than an unmatched area A', when a cylindrical lens is not used. Consequently, the light loss is reduced by the use of the cylindrical lens.

Referring back to FIGS. 2 and 3, the width of the light previously reduced by the scrolling unit 20 is returned to the original width by the second cylindrical lens 17. As described above, by controlling the width of light using the first and second cylindrical lenses 16 and 17, light loss can be reduced, and also the quality of the resultant color picture can be improved.

Next, the R, G, and B color beams transmitted by the second cylindrical lens 17 are focused on each of the lens cells of the first and second fly-eye lens arrays 34 and 35. After the R, G, and B beams pass through the lens cells of the first and second fly-eye lens arrays 34 and 35, they are separated and focused on corresponding color areas of the light valve 40 via the first relay lens 38, the reflection mirror 44, the second relay lens 39, and the TIR prism 60. Hence, color bars are formed on the light valve 40.

Light reflected by the light valve 40 passes through the TIR prism 60 once again and advances toward the projection lens unit 45.

The scrolling of the color bars formed on the light valve 40 will now be described with exemplary reference to FIGS. 9A through 9C. It is assumed that the scrolling unit 20 rotates in the direction indicated by an arrow as shown in FIG. 4.

Figure 9A:
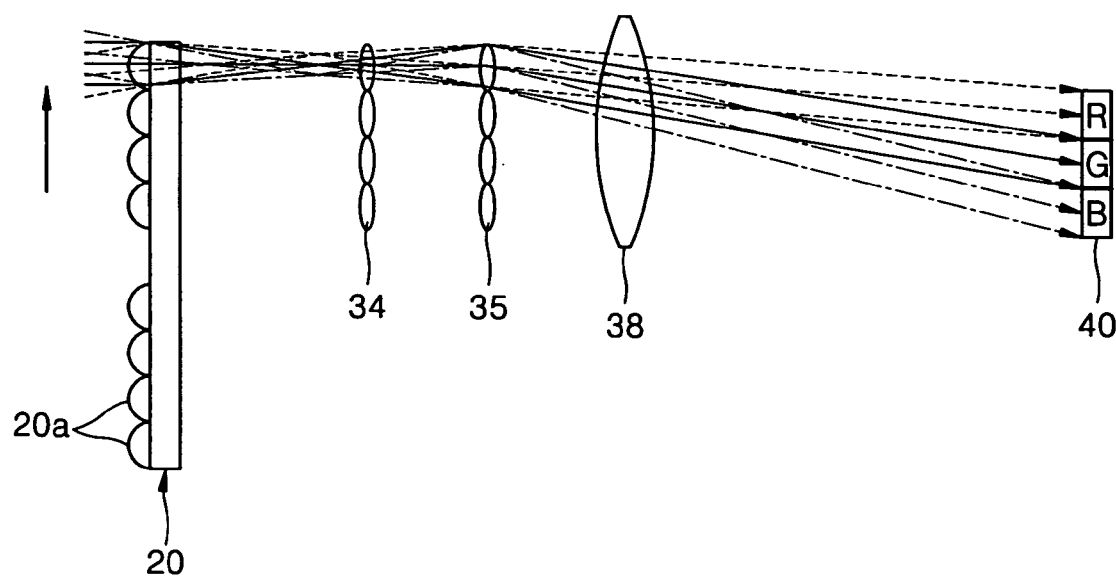
FIGS. 9A through 9C illustrate color scrolling that occurs in the projection system of FIGS. 2 and 3.
Figure 9B:
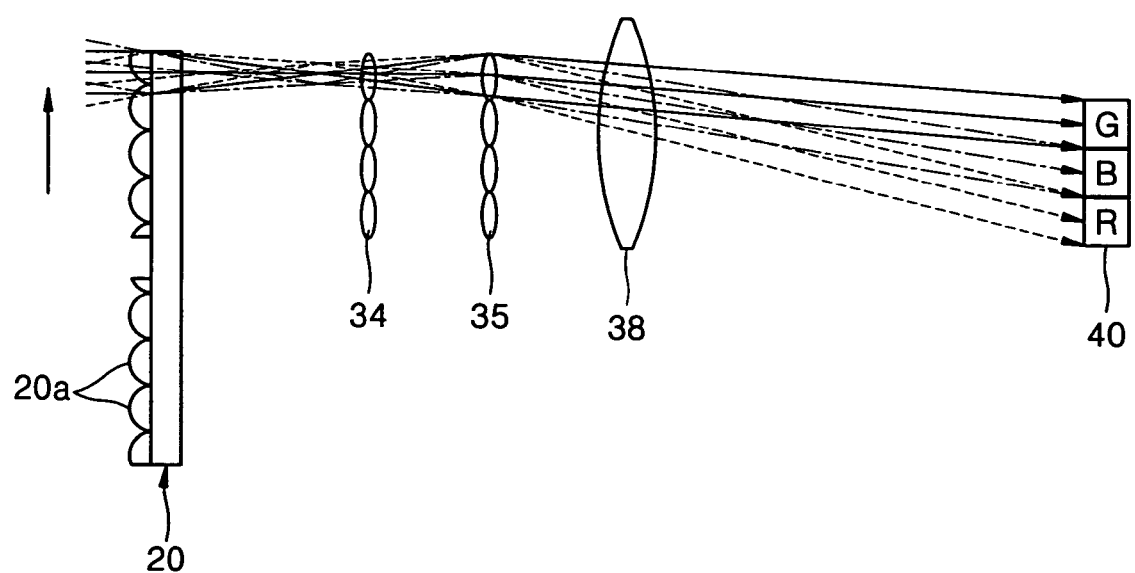
Figure 9C:
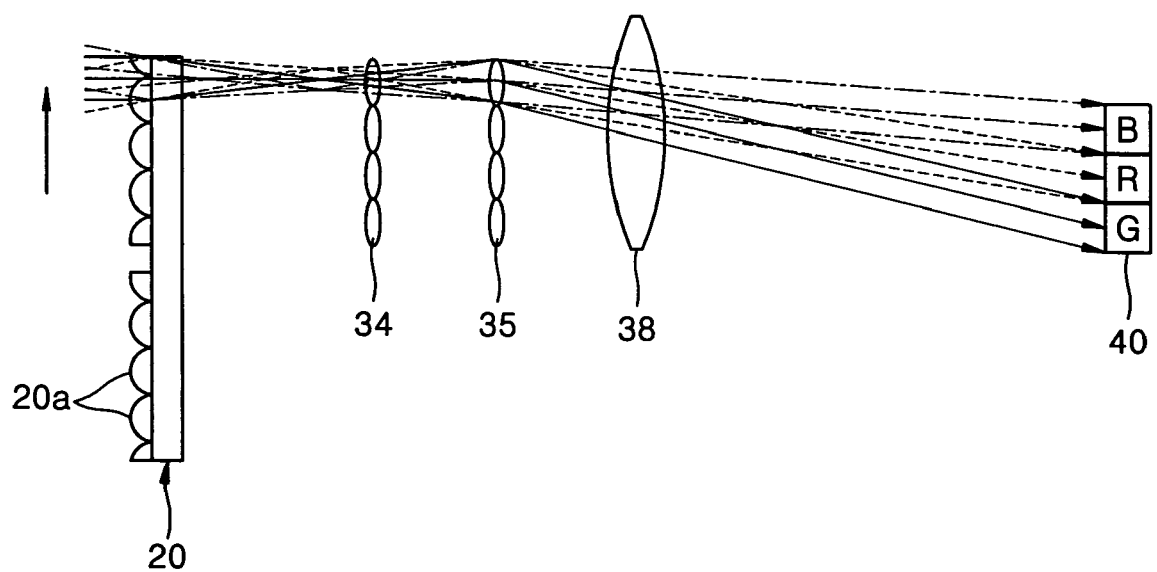

First, as illustrated in FIG. 9A, the R, G, and B beams produced by the color separator 15 of FIG. 3 are incident upon each of the lens cells 20a of the scrolling unit 20. After passing through the first and second fly-eye lens arrays 34 and 35 and the first relay lens 38, the R, G, and B beams are incident on corresponding color areas of the light valve 40. Hence, R, G, and B color bars are formed on the light valve 40. The first and second fly-eye lens arrays 34 and 35 and the first relay lens 38 focus incident color beams onto corresponding color areas of the light valve. First, the R, G, and B beams pass through the scrolling unit 20, the first and second fly eye lens arrays 34 and 35, and the first relay lens 38 and color bars are formed on the light valve 40 in a predetermined order, for example, in an order of R, G, and B. Next, the scrolling unit 20 rotates, and the lens surface of the scrolling unit 20 within an area L gradually moves outward while the color beams pass through the scrolling unit 20. Accordingly, the focal points of the color beams passing through the scrolling unit 20 vary as the scrolling unit 20 moves, and color bars in an order of G, B, and R are formed as illustrated in FIG. 9B. Then, as the scrolling unit 20 rotates, the incident color beams are scrolled, and color bars in an order of B, R, and G are formed as illustrated in FIG. 9C. In other words, the locations of the lenses of the scrolling unit 20, within an area L upon which beams are incident, change according to the rotation of the scrolling unit 20, as the rotation of the scrolling unit 20 causes a rectilinear motion of the area L of a lens array of the scrolling unit 20 through which light passes so that scrolling is performed. Such scrolling periodically repeats as the scrolling unit 20 rotates.

Color lines are formed on each of the lens cells 20a of the scrolling unit 20, and likewise, color lines are formed on each of the lens cells of the first fly-eye lens array 34. Preferably, but not necessarily, lens cells 20a of the scrolling unit 20 through which light passes are matched with lens rows of each of the first and second fly-eye lens arrays 34 and 35 in a one-to-one correspondence. In other words, if the number of lens cells 20a occupied by light passing through the scrolling unit 20 is 4, each of the first and second fly-eye lens arrays 34 and 35 preferably, but not necessarily, has 4 lens rows.

The number of lens cells 20a of the scrolling unit 20 can be set to synchronize the scrolling unit 20 with the operating frequency of the light valve 40. That is, the higher the operating frequency of the light valve 40, the more lens cells 20a are included in the scrolling unit 20 so that the scrolling speed can be increased while maintaining a constant rotation speed of the scrolling unit 20. Alternatively, the scrolling unit 20 can be synchronized with the operating frequency of the light valve 40 by controlling the rotation speed of the scrolling unit 20 while maintaining a constant number of the lens cells 20a of the scrolling unit 20.

Although an example where the scrolling unit 20 comprises a single spiral lens disk on which a plurality of cylindrical lens cells 20a are spirally arranged has been described above, various modifications can be made to the scrolling unit 20 as long as the rotation of the scrolling unit 20 causes the rectilinear motion of an area of a lens array of the scrolling unit 20 through which light passes so that color scrolling is performed. Hence, as illustrated in FIG. 5, the scrolling unit 20 may include a plurality of spiral lens disks.

Figure 10:
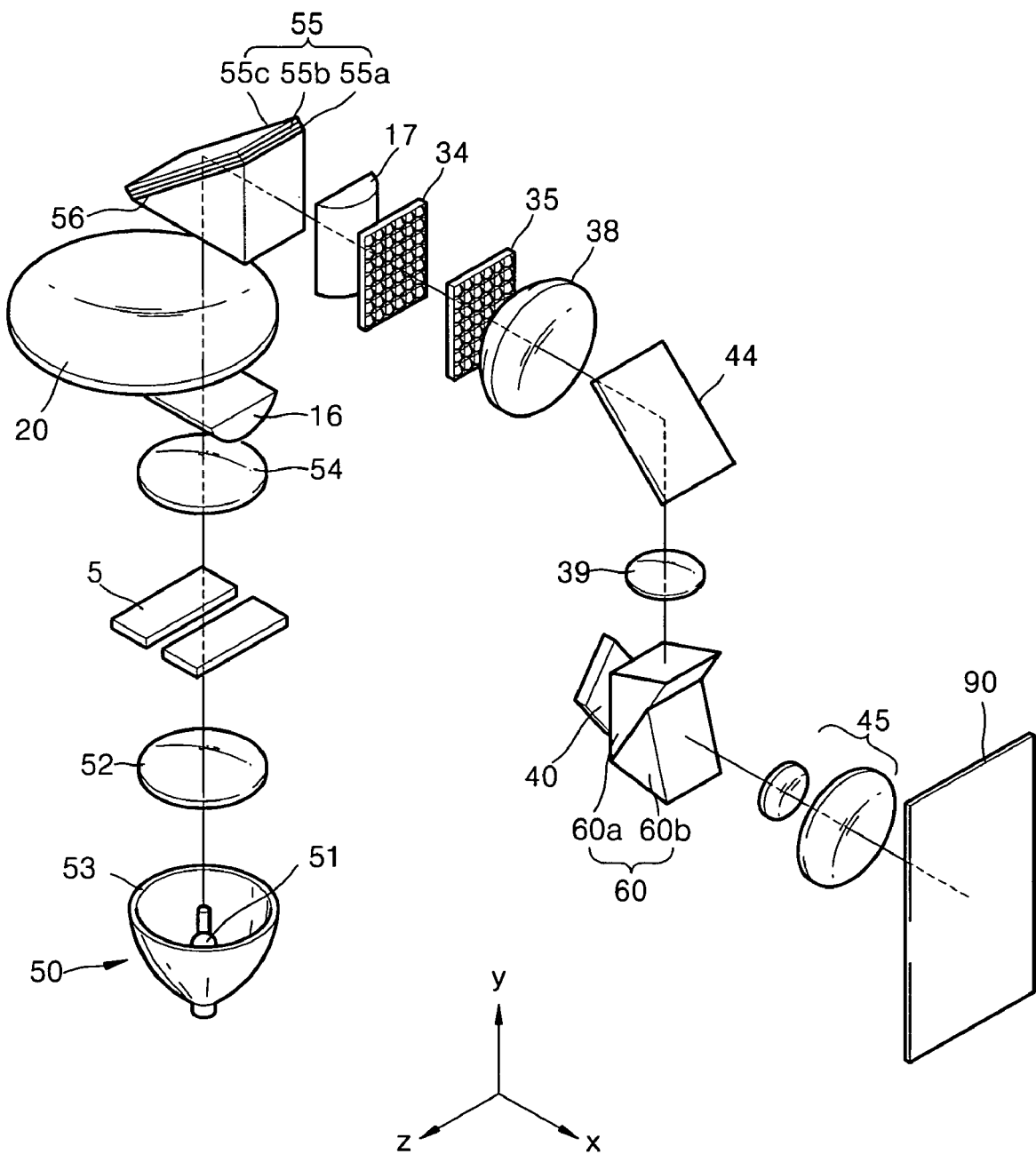
FIG. 10 is a perspective view of a configuration of a modified example of the projection system of FIGS. 2 and 3.
Figure 11:
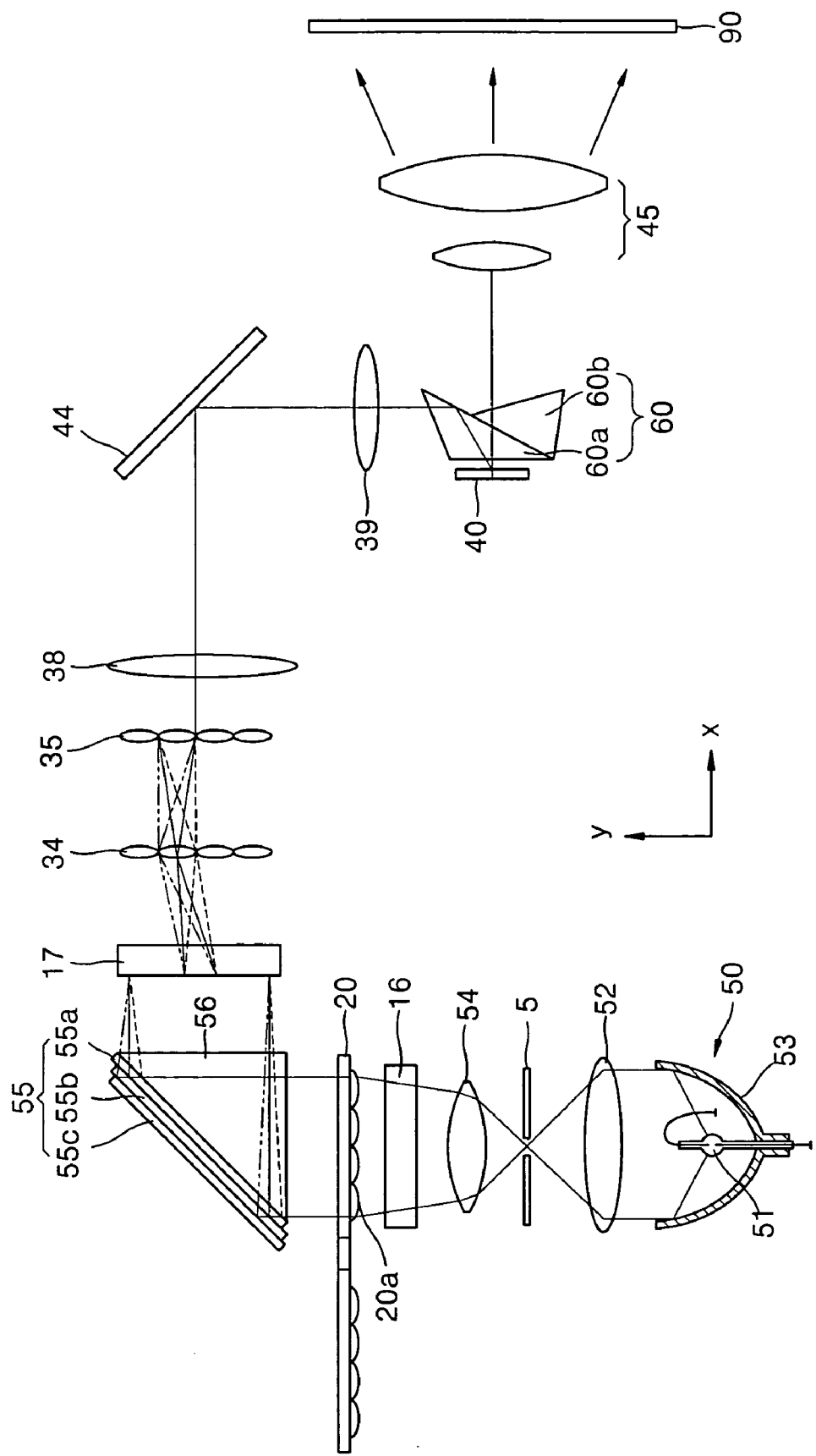
FIG. 11 is a schematic diagram of the modified projection system of FIG. 10.

FIGS. 10 and 11 are a perspective view and a schematic diagram, respectively, of a modified example of the projection system of FIG. 2. Referring to FIGS. 10 and 11, a modified projection system comprises a light source 50, a scrolling unit 20, a color separator 55, a light valve 40, a projection lens unit 45, and a TIR prism 60 that are sequentially arranged. The scrolling unit 20 rotates so as to scroll a light beam emitted from the light source 50. The color separator 55 separates a light beam transmitted by the scrolling unit 20 according to color. The light valve 40 processes the beams transmitted by the color separator 55 according to an image signal and forms a picture. The projection lens unit 45 magnifies the picture formed by the light valve 40 and projects the magnified picture onto the screen 90. The TIR prism 60 is disposed in front of the light valve 40 and transmits light passed through the color separator 55 toward the light valve 40 and light reflected by the light valve 40 toward the projection lens unit 45.

The light source 50 comprises a lamp 51 for generating a light beam and a reflection mirror 53 for reflecting the light beam emitted from the lamp 51 and for guiding the path of the reflected light beam. The reflection mirror 53 may be an elliptical mirror whose first focal point is the position of the lamp 51 and whose second focal point is a point where light is focused. Alternatively, the reflection mirror 53 may be a parabolic mirror which uses the lamp 51 as a focal point and which collimates the light beam emitted from the lamp 51.

The reflection mirror 53 shown in FIG. 11 is a parabolic mirror. Accordingly, a first collimating lens 52 for focusing incident light is also included.

A spatial filter 5, for controlling the divergence angle (or etendue) of light emitted from the light source 50, and a second collimating lens 54, for collimating an incident beam, are sequentially installed on the light path between the first collimating lens 52 and the scrolling unit 20. Since the spatial filter 5 has been described above and the second collimating lens 54 functions as the collimating lens 14 of FIG. 2, they will not be described again here.

A first cylindrical lens 16 for reducing the width of a light beam incident upon the scrolling unit 20 is installed in front of the scrolling unit 20. Since the principle of scrolling incident light by rotation of the scrolling unit 20 has been described above, it will not be described again here.

The color separator 55 includes first, second, and third dichroic filters 55a, 55b, and 55c which transmit or reflect incident light according to color. The first, second, and third dichroic filters 55a, 55b, and 55c are installed parallel to one another. Rays included in a light beam incident upon the scrolling unit 20 are transmitted at different angles according to different locations on each of the cylindrical lens cells 20a upon which the rays are incident. The light beam rays are reflected by the first, second, and third dichroic filters 55a, 55b, and 55c such that the light beam is separated according to color. Also, in contrast with the projection system of FIGS. 2 and 3, a prism 56 is further included between the scrolling unit 20 and the color separator 55 such that an incident light is transferred to the color separator 55 without a change in the path of the light.

The second cylindrical lens 17, the first and second fly-eye lens arrays 34 and 35, the first relay lens 38, the reflection mirror 44, the second relay lens 39, and the TIR prism 60 are sequentially arranged on the light path between the color separator 55 and the light valve 40. The second cylindrical lens 17 widens the beam narrowed by the first cylindrical lens 16 to a beam with the original width. Since the first and second fly-eye lens arrays 34 and 35, the first and second relay lens 38 and 39, the reflection mirror 44, the TIR prism 60, and the light valve 40 have been described above, they will not be described again here.

The projection lens unit 45 magnifies the picture formed by the light valve 40 and projects the magnified picture onto the screen 90.

Figure 12:
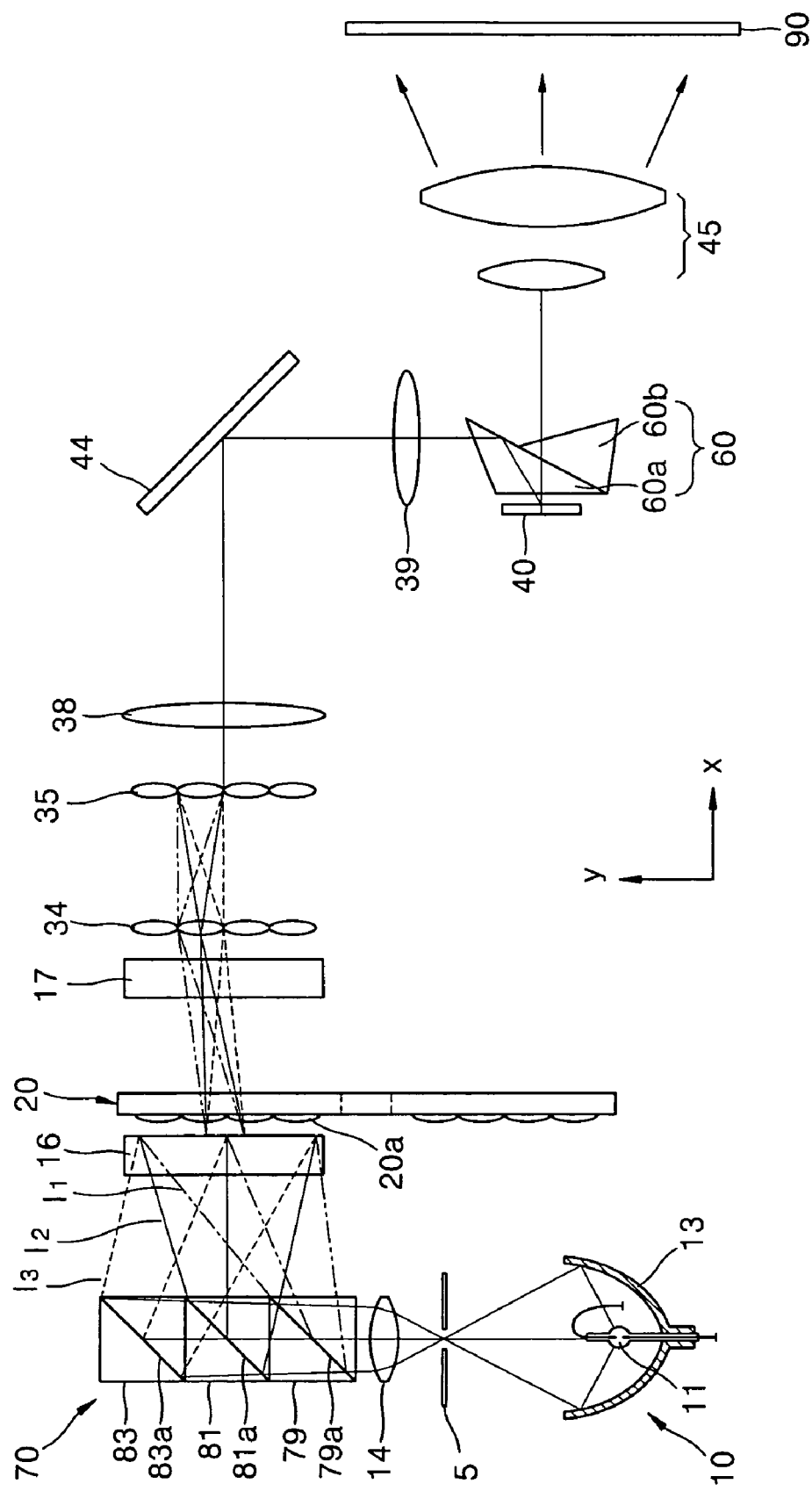
FIG. 12 is a schematic diagram of another modified example of the projection system of FIGS. 2 and 3.

FIG. 12 is a schematic diagram of another modified example of the projection system of FIGS. 2 and 3. Since this projection system is similar to the projection system of FIGS. 2 and 3 except that an optical pipe 70 is used as a color separator, only the optical pipe 70 will be described here in detail.

Referring to FIG. 12, the optical pipe 70 includes first, second, and third dichroic prisms 79, 81, and 83, each of which reflects a beam in a specific wavelength range and transmits beams in all other wavelength ranges such that light incident upon the optical pipe 70 is separated into first, second, and third color beams $I_1$, $I_2$, and $I_3$.

The first dichroic prism 79 includes a first dichroic filter 79a, which reflects the first color beam $I_1$ of the incident beam and transmits the second and third color beams $I_2$, and $I_3$. For example, the first dichroic filter 79a can reflect an R beam and transmit G and B beams.

The second dichroic prism 81 is attached to the first dichroic prism 79 and includes a second dichroic filter 81a. The second dichroic filter 81a reflects the second color beam I2, for example, the G beam, and transmits the first and third color beams $I_1$, and $I_3$, for example, the R and B beams.

The third dichroic prism 83 is attached to the second dichroic prism 81 and includes a third dichroic filter 83a. The third dichroic filter 83a reflects the third color beam $I_3$, for example, the B beam, and transmits the first and second color beams $I_1$, and $I_2$, for example the R and G beams. The third dichroic filter 83a may be replaced by a total reflection mirror which can reflect the entire incident beam.

The light emitted from the light source 10 is separated into beams of different colors by the optical pipe 70 with the above-described configuration, and the beams of different colors are directed toward the scrolling unit 20.

Figure 13:
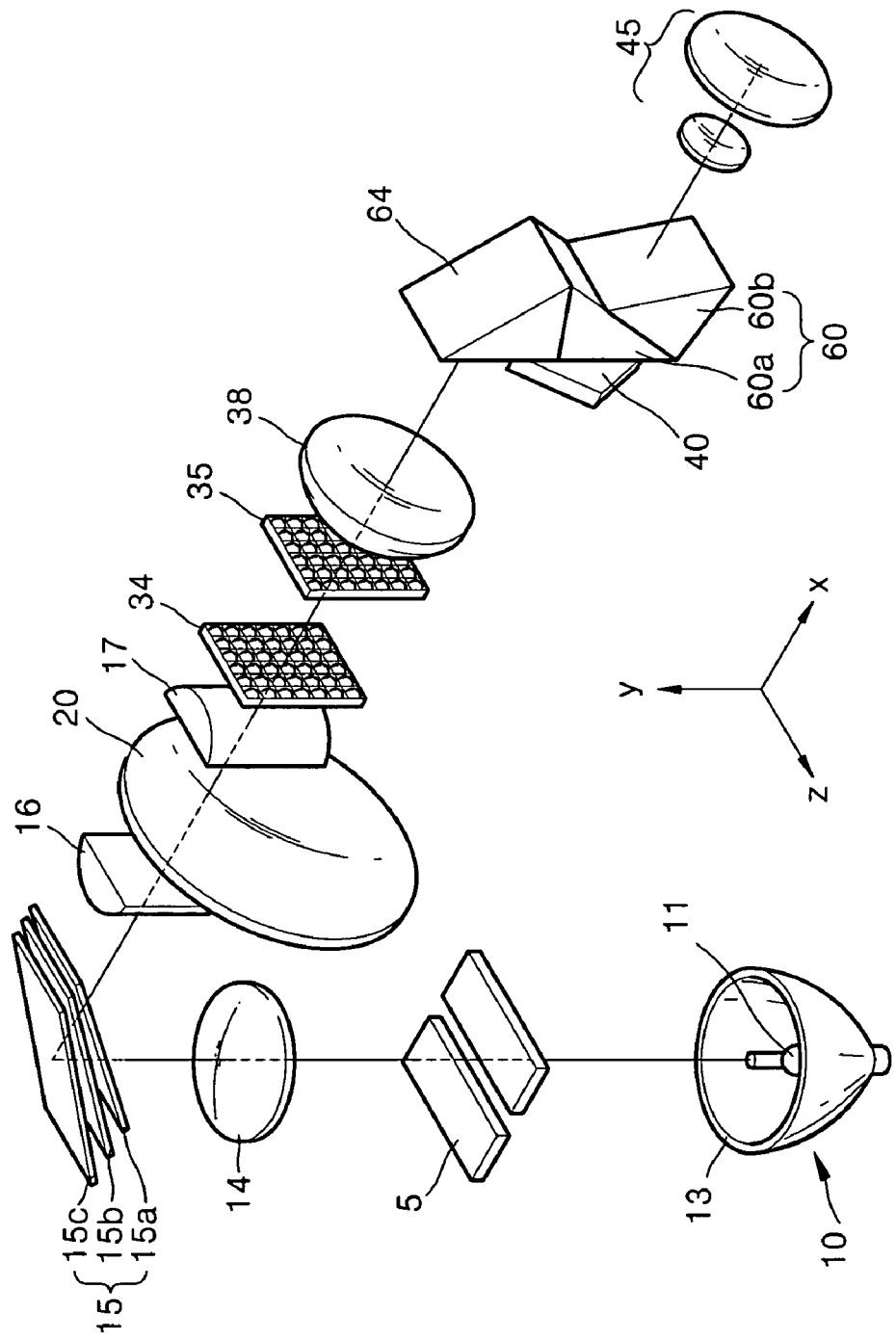
FIG. 13 is a perspective view of a configuration of a projection system according to another embodiment of the present invention.

FIG. 13 is a perspective view schematically showing an arrangement of a projection system according to another embodiment of the present invention. Since the projection system of FIG. 13 is the same as that of FIG. 2 except that a reflection prism 64 instead of the reflection mirror 44 of FIG. 2 is disposed in front of the TIR prism 60, only the reflection prism 64 will be described herein. The optical separator 15 of FIG. 13 may be replaced by the optical pipe 70 of FIG. 12.

Referring to FIG. 13, the reflection prism 64 is attached to the incidence surface of the first prism 60a of the TIR prism 60 so as to direct light passed through the first relay lens 38 toward the TIR prism 60. A reflection surface of the reflection prism 64 is inclined at a predetermined angle so that light incident upon the TIR prism 60 can meet the total reflection condition.

Figure 14:
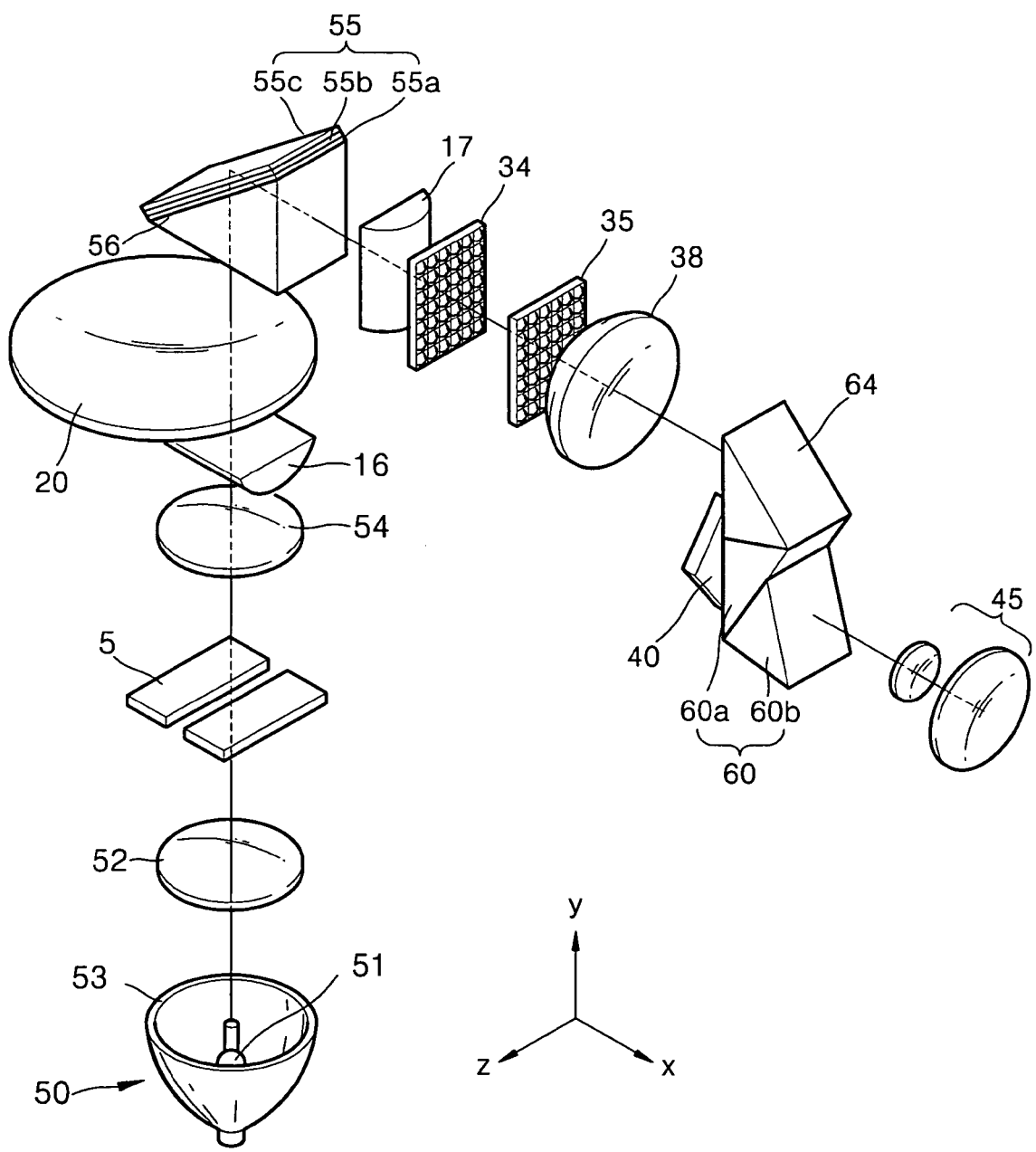
FIG. 14 is a perspective view of a configuration of a modified example of the projection system of FIG. 13.

FIG. 14 is a perspective view schematically showing an arrangement of a modified example of the projection system of FIG. 13. Since the projection system of FIG. 14 is similar to the projection system of FIG. 10 except that a reflection prism 64 instead of the reflection mirror is disposed in front of the TIR prism 60, and even the reflection prism 64 has been described above, the projection system of FIG. 14 will not be described again here.

Figure 15:
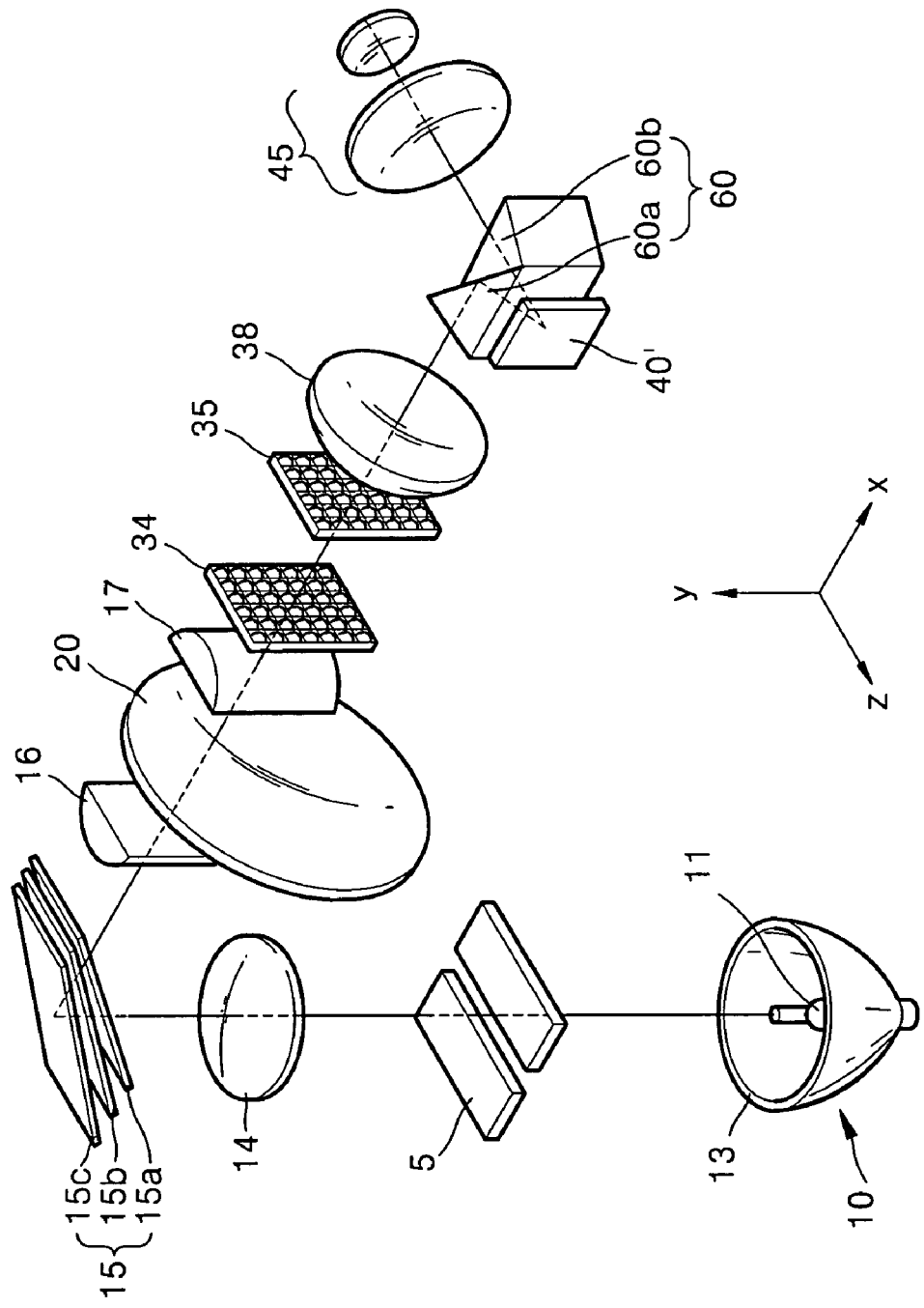
FIG. 15 is a perspective view of a configuration of a projection system according to still another embodiment of the present invention.

FIG. 15 is a perspective view schematically showing an arrangement of a projection system according to still another embodiment of the present invention. Since the projection system of FIG. 15 is the same as that of FIG. 2 except that the micromirrors of a DLP panel used as a light valve 40' are driven in a perpendicular driving way, only the difference will be described herein. The optical separator 15 of FIG. 15 may be replaced by the optical pipe 70 of FIG. 12.

Referring to FIG. 15, a TIR prism 60 includes a first prism 60a, having an incidence surface, and a second prism 60b, having an emission surface so as to send light passed through the a relay lens 38 toward the light valve 40' and light reflected by the light valve 40' toward the projection lens unit 45. The TIR prism 60 is disposed such that incident light can satisfy the total reflection condition.

Figure 16:
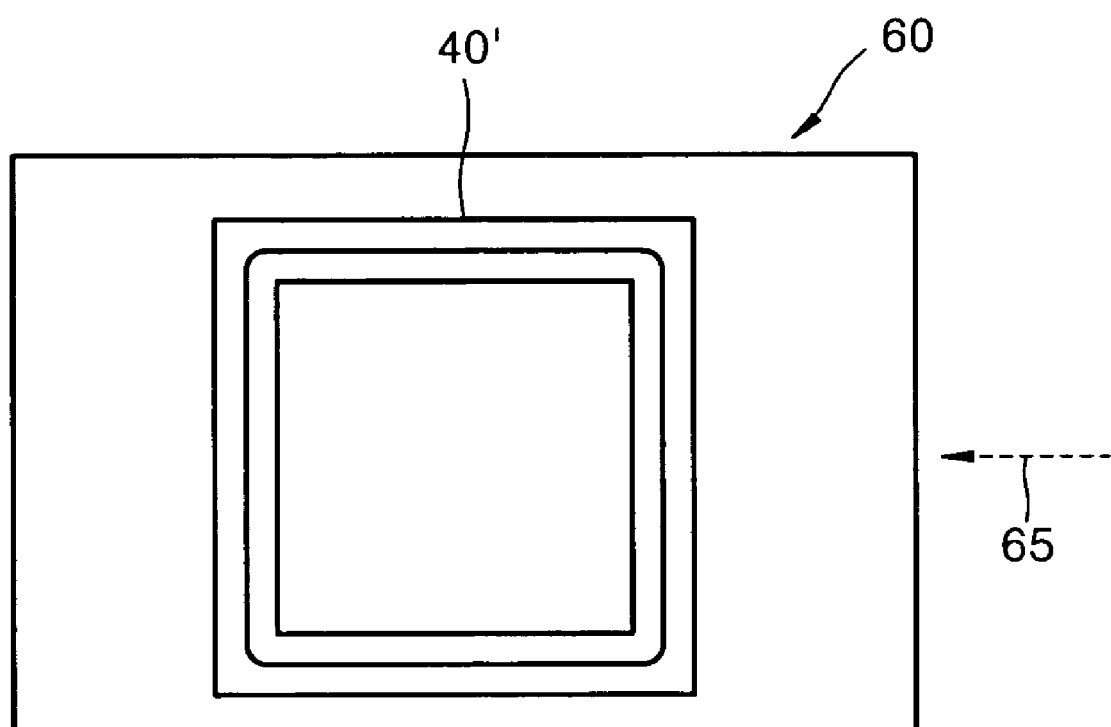
FIG. 16 is a side view of a configuration of a TIR prism and a DLP panel in the projection system of FIG. 15.

The micromirrors of the DLP panel which is the light valve 40' are independently driven according to an image signal and change the reflection angle of incident light in order to turn on or off the incident light, thereby forming a color image. As illustrated in FIG. 16, the DLP panel 40' is disposed at a right angle with respect to incident light 65 so that the micromirrors are perpendicularly driven according to the image signal.

Figure 17:
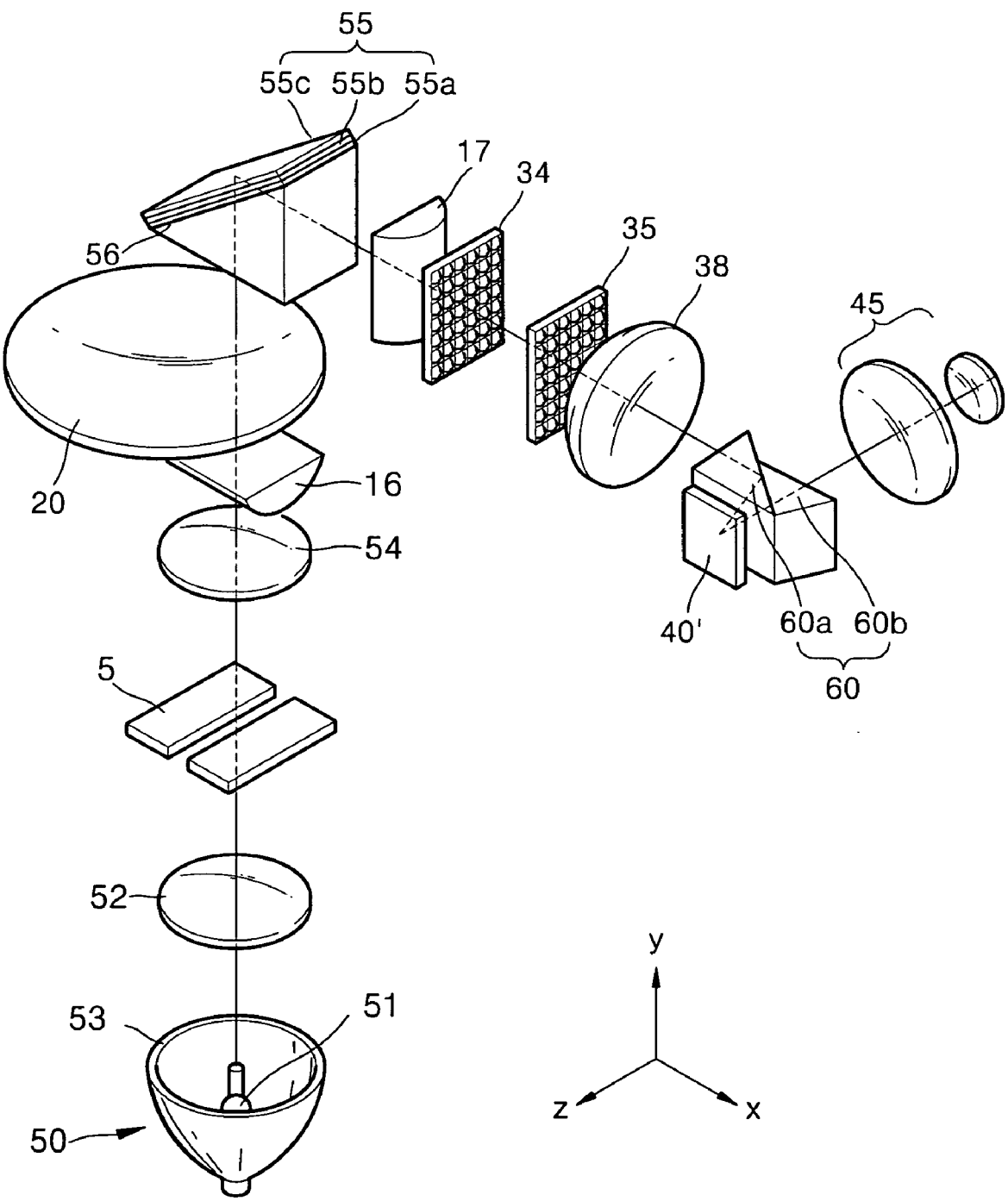
FIG. 17 is a perspective view of a configuration of a modified example of the projection system of FIG. 15.

FIG. 17 is a perspective view schematically showing an arrangement of a modified example of the projection system of FIG. 15. Since the projection system of FIG. 17 is the same as that of FIG. 10 except that the micrometers of a DLP panel used as a light valve 40' are driven in a perpendicular driving way, and even the perpendicular driving of the light valve has been described above, the description thereof will be omitted.

As described above, a projection system according to the present invention has the following effects. First, the low light efficiency caused by a conventional single-panel DLP projection system using a color wheel is increased by utilizing a low-power low-priced lamp.

Second, a high-brightness image can be obtained without need to use a high-gain screen, whereby a wide viewing angle is secured.

Third, instead of a scrolling unit for each individual color, a single scrolling unit is installed to deal with all color beams, thereby minimizing the size of the projection system.

Fourth, scrolling is performed by rotating the scrolling unit in one direction without changing the direction, thereby achieving continuous, consistent scrolling. Also, the single scrolling unit can be used to scroll all color beams, thereby keeping the speed of color bars constant. The synchronization of the color bars is easily controlled.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection system comprising:
    a light source;
    a color separator which separates an incident beam according to color;
    a scrolling unit, comprising at least one lens cell, which converts a rotation of the lens cell into the rectilinear motion of an area of the lens cell through which light passes so that an incident beam is scrolled;
    a light valve which processes a beam transmitted by the color separator and the scrolling unit according to an image signal and which forms a color picture, the light valve comprising a plurality of micromirrors independently driven according to image signals to change a reflection angle of incident light; and
    a projection lens unit which magntifies the color picture formed by the light valve and which projects the magnified color picture onto a screen;
    wherein the micromirrors are diagonally driven according to the image signals; and
    wherein the scrolling unit comprises
        first and second spiral lens disks installed apart from each other, each including at least one spirally disposed cylindrical lens cell, and
        a glass rod disposed between the first and second spiral lens disks.

2. The projection system of claim 1, further comprising a total internal reflection prism disposed in front of the light valve, which directs light passed through the color separator and the scrolling unit toward the light valve and which directs light reflected by the light valve toward the projection lens unit.

3. The projection system of claim 2, wherein the total internal reflection prism comprises:
    a first prism, having an incidence surface,
    a second prism, attached to the first prism at an interface and having an emission surface, and
    a total reflection surface, formed on the interface between the first and second prisms, for totally reflecting incident light at a predetermined angle.

4. The projection system of claim 3, further comprising a reflection mirror disposed in front of the incidence surface of the first prism, which reflects light passed through the color separator and the scrolling unit toward the incidence surface of the first prism.

5. The projection system of claim 1, wherein the color separator comprises first, second, and third dichroic filters, which are disposed at different angles between the light source and the scrolling unit and each of which reflects a beam of a color and transmits beams of all other colors.

6. The projection system of claim 1, wherein the color separator comprises
    first, second, and third dichroic prisms sequentially attached to one another between the light source and the scrolling unit,
    wherein the first, second, and third dichroic prisms respectively include first, second, and third dichroic filters, each of which reflects a beam of a color and transmits beams of all other colors.

7. The projection system of claim 1, wherein the color separator comprises first, second, and third dichroic filters, which are disposed in parallel between the light source and the scrolling unit and each of which reflects a beam of a color and transmits beams of all other colors.

8. The projection system of claim 7, further comprising a prism disposed in front of the color separator.

9. The projection system of claim 1, further comprising a spatial filter disposed between the light source and the scrolling unit, which controls a divergence angle of the light emitted from the light source.

10. The projection system of claim 1, further comprising first and second cylindrical lenses respectively disposed in front of and behind the scrolling unit.

11. The projection system of claim 1, further comprising first and second fly-eye lens arrays sequentially disposed on a light path between the scrolling unit and the light valve.

12. The projection system of claim 11, further comprising a relay lens disposed on a light path between the second fly-eye lens array and the light valve.

13. A projection system comprising:
    a light source;
    a color separator which separates an incident beam according to color;
    a scrolling unit, comprising at least one lens cell, which converts a rotation of the lens cell into the rectilinear motion of an area of the lens cell through which light passes so that an incident beam is scrolled;
    a light valve which processes a beam transmitted by the color separator and the scrolling unit according to an image signal and which forms a color picture, the light valve comprising a plurality of micromirrors independently driven according to image signals to change a reflection angle of incident light;
    a projection lens unit which magnifies the color picture formed by the light valve and which projects the magnified color picture onto a screen;
    a total internal reflection prism disposed in front of the light valve, which directs light passed through the color separator and the scrolling unit toward the light valve and which directs light reflected by the light valve toward the projection lens unit, the total internal reflection prism comprising:
        a first prism, having an incidence surface,
        a second prism, attached to the first prism at an interface and having an emission surface, and
        a total reflection surface, formed on the interface between the first and second prisms, for totally reflecting incident light at a predetermined angle; and a reflection prism disposed in front of the incidence surface of the first prism, which reflects light passed through the color separator and the scrolling unit toward the incidence surface of the first prism;

wherein the micromirrors are diagonally driven according to the image signals.

14. A projection system, comprising:

a light source;

a color separator which separates an incident beam according to color;

a scrolling unit, comprising at least one lens cell, which converts a rotation of the lens cell into the rectilinear motion of an area of the lens cell through which light passes so that an incident beam is scrolled;

a light valve which processes a beam transmitted by the color separator and the scrolling unit according to an image signal and which forms a color picture, the light valve comprising a plurality of micromirrors independently driven according to image signals to change a reflection angle of incident light; and a projection lens unit which magnifies the color picture formed by the light valve and which projects the magnified color picture onto a screen;

wherein the micromirrors are perpendicularly driven according to the image signals; and wherein the scrolling unit comprises:

first and second spiral lens disks installed apart from each other, each including at least one spirally disposed cylindrical lens cell, and a glass rod disposed between the first and second spiral lens disks.

* * * * *